US010029573B2

(12) United States Patent
Gale et al.

(10) Patent No.: US 10,029,573 B2
(45) Date of Patent: Jul. 24, 2018

(54) VEHICLE BATTERY CHARGING SYSTEM NOTIFICATION

(71) Applicant: Ford Global Technologies, LLC, Dearborn, MI (US)

(72) Inventors: Allan Roy Gale, Livonia, MI (US); Michael W. Degner, Novi, MI (US); Lu Chen, Boulder, CO (US); Paul Theodore Momcilovich, Tecumseh, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 305 days.

(21) Appl. No.: 14/470,428

(22) Filed: Aug. 27, 2014

(65) Prior Publication Data
US 2016/0059716 A1    Mar. 3, 2016

(51) Int. Cl.
*H02J 7/00* (2006.01)
*B60L 11/18* (2006.01)

(52) U.S. Cl.
CPC ......... *B60L 11/1816* (2013.01); *B60L 11/185* (2013.01); *B60L 11/1838* (2013.01); *B60L 11/1848* (2013.01); *B60L 2230/00* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/169* (2013.01); *Y04S 30/14* (2013.01)

(58) Field of Classification Search
CPC ..... Y02T 90/14; Y02T 90/128; B60L 11/1809
USPC .................. 320/104, 109, 153, 162
See application file for complete search history.

(56) References Cited

U.S. PATENT DOCUMENTS

| 4,730,242 | A | 3/1988  | Divan            |
|-----------|---|---------|------------------|
| 4,833,584 | A | 5/1989  | Divan            |
| 5,017,800 | A | 5/1991  | Divan            |
| 5,027,264 | A | 6/1991  | DeDoncker et al. |
| 5,099,410 | A | 3/1992  | Divan            |
| 5,157,319 | A | 10/1992 | Klontz et al.    |
| 5,224,025 | A | 6/1993  | Divan et al.     |
| 5,272,616 | A | 12/1993 | Divan et al.     |
| 5,301,096 | A | 4/1994  | Klontz et al.    |
| 5,402,053 | A | 3/1995  | Divan et al.     |
| 5,465,203 | A | 11/1995 | Bhattacharya et al. |
| 5,483,140 | A | 1/1996  | Hess et al.      |
| 5,513,090 | A | 4/1996  | Bhattacharya et al. |

(Continued)

FOREIGN PATENT DOCUMENTS

| CA | 1293021      | 12/1991 |
|----|--------------|---------|
| WO | WO12015890 A1 | 2/2012 |
| WO | WO12015942 A1 | 2/2012 |

*Primary Examiner* — Edward Tso
*Assistant Examiner* — Aaron Piggush
(74) *Attorney, Agent, or Firm* — David B. Kelley; Brooks Kushman P.C.

(57) ABSTRACT

A battery electrical vehicle or plug-in hybrid electric vehicle includes a battery which may be charged by an electrical charging station coupled to the electric power grid. To maximize the charging efficiency thus decreasing charge time, the voltage and current drawn from the power grid may be closely monitored. Based on the monitoring of the voltage and current of an electrical circuit powering a battery charger, a notification of changing conditions to charging characteristics including electric circuit wiring resistance, power loss or wiring efficiency may be generated.

9 Claims, 5 Drawing Sheets

(56) References Cited

U.S. PATENT DOCUMENTS

| | | |
|---|---|---|
| 5,596,492 A | 1/1997 | Divan et al. |
| 5,619,406 A | 4/1997 | Divan et al. |
| 5,659,237 A | 8/1997 | Divan et al. |
| 5,684,683 A | 11/1997 | Divan et al. |
| 5,731,965 A | 3/1998 | Cheng et al. |
| 5,757,099 A | 5/1998 | Cheng et al. |
| 5,781,419 A | 7/1998 | Kutkut et al. |
| 5,852,558 A | 12/1998 | Julian et al. |
| 5,883,796 A | 3/1999 | Cheng et al. |
| 5,969,957 A | 10/1999 | Divan et al. |
| 6,087,916 A | 7/2000 | Kutkut et al. |
| 6,118,676 A | 9/2000 | Divan et al. |
| 9,056,553 B2 * | 6/2015 | Cun ............... B60W 20/00 |
| 2004/0070278 A1 | 4/2004 | Divan et al. |
| 2005/0057265 A1 | 3/2005 | Harley et al. |
| 2005/0073200 A1 | 4/2005 | Divan et al. |
| 2006/0202636 A1 | 9/2006 | Schneider |
| 2008/0247105 A1 | 10/2008 | Divan |
| 2008/0247106 A1 | 10/2008 | Divan |
| 2008/0278976 A1 | 11/2008 | Schneider et al. |
| 2010/0019805 A1 | 1/2010 | Divan et al. |
| 2010/0076615 A1 * | 3/2010 | Daniel ............... F03D 9/00 700/293 |
| 2010/0259227 A1 * | 10/2010 | Gale ............... H02J 7/022 320/162 |
| 2012/0063042 A1 | 3/2012 | Divan |
| 2012/0081072 A1 | 4/2012 | Gale et al. |
| 2012/0169141 A1 | 7/2012 | Divan |
| 2012/0262140 A1 | 10/2012 | Divan |
| 2015/0331135 A1 * | 11/2015 | Widmer ............ G01V 3/101 324/234 |

\* cited by examiner

VEHICLE BATTERY CHARGING SYSTEM NOTIFICATION

TECHNICAL FIELD

This disclosure relates to the detection and notification of changing electrical conditions during the charging of a vehicle battery.

BACKGROUND

As plug-in hybrid-electric vehicles (PHEV) and battery electric vehicles (BEV) become more prevalent and are deployed in more locations, so has the installation of electrical charging stations for those vehicle's traction batteries. Electrical charging stations for vehicle traction batteries may draw a substantial current to meet the user charge time requirements as advancements in vehicle propulsion and battery technology have occurred.

SUMMARY

A vehicle battery charging system includes a battery charger configured to be coupled with a power grid distribution node. The vehicle battery charging system also includes at least one controller programmed to transmit a signal indicative of a characteristic of the distribution node during a battery charge procedure. The signal is based on changes in charger input current and changes in charger input voltage indicative of a change in resistance of the distribution node.

A vehicle includes a battery charger capable of coupling with a power grid distribution node. The vehicle also includes at least one controller programmed to transmit a signal indicative of a characteristic of the distribution node during a battery charge procedure. The characteristic of the distribution node is based on a resistance of the distribution node. The resistance is based on a change, over a time interval, of a charger input current and a change, over the time interval, of a charger input voltage.

A method of battery charge notification includes measuring a change in input voltage and a change in input current of a battery charger electrically connected with a power grid distribution node. The changes are measured over a predetermined time interval. The method further includes outputting a notification message indicative of a characteristic based on a change in resistance of a power grid distribution node.

DETAILED DESCRIPTION

Figure 1:
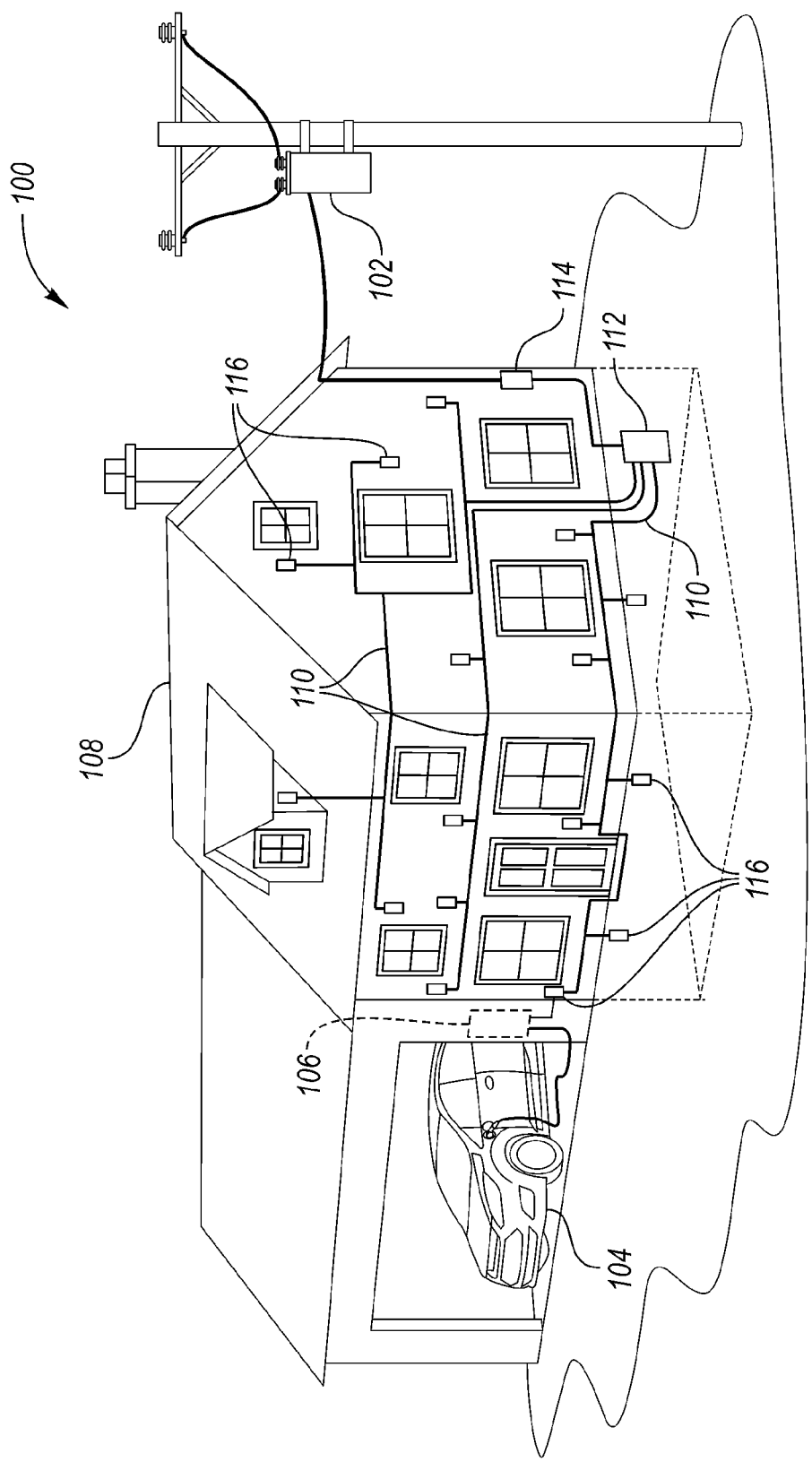
FIG. 1 is a diagrammatic view of an exemplary household electrical topology from the pole transformer to the electric vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles may have many powertrain configurations; some of the configurations include electrical propulsion systems in which propulsion power may be stored in a traction battery. Examples include battery electric vehicles (BEVs) and plug-in hybrid electric vehicles (PHEVs). A traction battery may be recharged during operation by different methods including regenerative braking and operating an internal combustion engine (ICE) to turn a generator. In addition to charging traction batteries during ICE operation, the traction battery may be configured to be recharged from an electric power grid. When a vehicle is charged from the electric power grid, it is beneficial to maximize efficiency of charging and to minimize the time required to charge the battery. To achieve optimal performance from a battery charger, it is desirable and recommended to have the battery charger on a dedicated electric circuit. However, due to variations in home construction and layouts, a dedicated electrical outlet may not be readily available. The charging of the vehicle traction battery may be performed by a separate charging station utilizing a charging standard including J1777 and EVSE (electric vehicle supply equipment), or may utilize a dedicated protocol to charge the traction battery.

A vehicle may include a traction battery, to provide power for propulsion, and a single controller or multiple controllers that are used to control multiple vehicle systems and functions. One function that may be performed by a controller is traction battery charging control for PHEVs or BEVs. For example, the vehicle traction battery charging control may reside inside a vehicle controller (e.g., a vehicle system controller (VSC), a powertrain control module (PCM), power electronics control module (PECM), power conversion module, power converter and power inverter). The vehicle charging control portion of the controller may be software embedded within the module, or it may be separate circuitry or hardware. The vehicle controller generally includes any number of microprocessors, ASICs, ICs, memory (e.g., FLASH, ROM, RAM, EPROM and/or EEPROM) and software code to co-act with one another to perform a series of operations. The vehicle controller may also be dedicated hardware to perform this function. The vehicle controller may further include at least one sensor to measure a charge voltage and a charge current, a timer to measure a window of time, and a microprocessor to process voltage, current and time information. The controller may process the charge current and charge voltage over a period of time and calculate a change in current and a change in voltage over the period of time. The charge voltage and current may be measured substantially contemporaneously or may have a predetermined time interval between the measurement of the voltage and the current to compensate for sensor operation. The vehicle controller is generally in electrical communication with the vehicle battery and receives signals that indicate the battery charge level. The signals may also include the battery charge voltage and battery charge current along with the charger input voltage and charger input current to the vehicle charger. The vehicle controller may further communicate with other controllers over a wireline vehicle connection using a common bus protocol (e.g., CAN, LIN, FlexRay), however, this connection may also be a wireless connection (e.g., WiFi, Bluetooth). The vehicle controller may also communicate with the charge station, a computer system or a remote consumer electronic system (e.g., smart mobile phone, personal computer or computer tablet). This communication may be accomplished via direct physical link, such as a wired connection, or via wireless communication, such as short range wireless communication including but not limited to short range 802.11, 802.15 and 802.16, and long range wireless communication including but not limited to GSM, CDMA, UMTS, 3G, W-CDMA and 4G-LTE. The use of wireline and wireless IEEE protocols listed above may be referred to as IEEE 802 data networks.

The vehicle charger may be coupled to the vehicle traction battery multiple ways (e.g., conductive coupling, inductive coupling). The charger controller may include embedded software, programmable to regulate power flow provided by the vehicle charger. The software and hardware included with the charger controller may also include a timer to track or measure elapsed time between designated events. Under selected conditions, or upon the receipt of designated instructions, the charger controller may enable, disable, or reduce the power flowing through the charger. The vehicle charger may be configured to receive signals indicative of charge instructions from a vehicle controller.

FIG. 1 is a diagrammatic view of an exemplary household electrical topology 100, illustrating power grid distribution and a power grid distribution node, from a pole transformer 102, or utility pole transformer to an electric vehicle 104 coupled to a vehicle charger 106. Note, the vehicle charger may reside within the vehicle, or may be a standalone charging station that a vehicle is electrically coupled to. A house 108 may have electricity distributed throughout for the residential use. However the principles of this example may also be used in commercial locations. The power distribution is accomplished by individual household electric circuits 110, also commonly referred to as local household circuits, electric circuits, power grid distribution nodes or distribution nodes. The electric circuit 110 for residential use is typically generated at a utility company generator and carried to the house 108 via a combination of high voltage transmission lines, which may include voltages of 138 kV to 765 kV, and medium voltage transmission lines or distribution lines, which may include voltages of 4,800V to 41,600V. The voltage from the distribution lines is stepped down by a pole transformer 102 to a nominal voltage which may be 240V RMS per phase which the utility companies regulate to +/−5% or 228V to 252V RMS. The pole transformer 102 may be configured with a 3-wire secondary winding (i.e., one neutral terminal and two "hot" or live terminals). The voltage across a single live terminal and the neutral terminal is 120V RMS with the same percent regulation as single phase and the voltage across the two live terminals is 240V single phase. The three terminals may be connected to an electric meter 114 to measure the power utilized by the household. The average AC power may be calculated as the voltage multiplied by the current multiplied by the cosine of the phase angle between the voltage and current. For a purely resistive load, the cosine of the phase angle is 1, resulting in the average AC power equal to the voltage multiplied by the current.

Each individual household electric circuit 110 or household circuitry is connected to a circuit breaker box 112 also called a breaker box or main breaker load center. Within the breaker box 112, are individual circuit breakers (not shown), these circuit breakers may have a specific current rating (e.g., 15 amp, 20 amp, 30 amp, 50 amp and 100 amp) associated with the nominal voltage of the household. There may be specific requirements (i.e., The U.S. National Electrical Code) for the size of the electric wire used in a household circuit 110. For example, a circuit using a 120V, 15 amp breaker typically uses 14 gauge copper wire and a circuit using a 120V, 20 amp breaker typically uses 12 gauge copper wire. Each electric circuit 110 may include multiple electric outlets 116. The number of electric outlets 116 (e.g., duplex plugs, electrical plugs, electrical sockets) may be limited by a standard (i.e., The U.S. National Electrical Code) as to how many electric outlets 116 are allowed on a certain circuit breaker. For example, a 120V/15 amp circuit breaker may allow a maximum of 8 electric outlets and a 120V/20 amp breaker may allow a maximum of 10 electric outlets. This may vary as home builders and electricians meet the specific needs of the location and resident.

Connected to one of the electric circuits 110 may be a vehicle charger 106 which may charge a vehicle 104. The vehicle charger 106 may be located in the vehicle and include electronics to adjust for changes to the power factor to maintain the power factor at 1 (i.e., the phase angle would be 0 and the cosine of the phase angle would be 1). The vehicle charger 106 may be capable of drawing high currents and have the ability to monitor the line current and voltage to adjust for fluctuations caused by the electric circuit 110 and any electric appliance, consumer product or electric component connected to the electric circuit 110.

Figure 2:
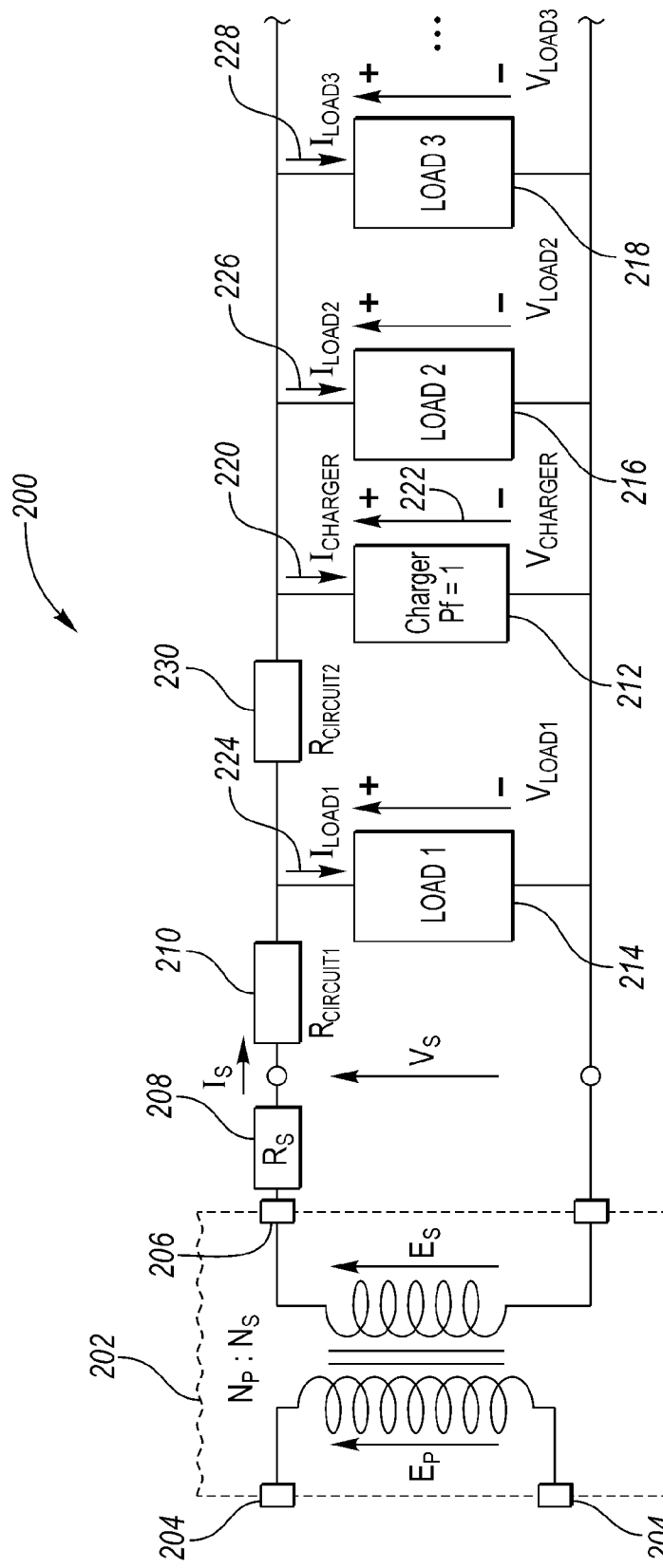
FIG. 2 is a schematic diagram of an exemplary household electric circuit including the transformer.

FIG. 2 is a schematic diagram of a local household electric circuit including a transformer 202. A simplified household electric circuit 200 includes the transformer 202 having primary terminals 204 and secondary terminals 206. The transformer illustrated has two primary and two secondary terminals, however other transformer configurations may also be used (e.g. a transformer with 3 secondary terminals). A resistance of the line prior to circuit 110 is represented as $R_s$ 208 in which the resistance may be attributed to meter resistance, wire resistance, wire connection or wire coupling of dissimilar materials. The current is drawn by loads including the charger 212 and other loads on the circuit (e.g., load1, load2, . . . loadn) (214, 216, 218). Note that load2-loadn will result in a voltage drop across Rs 208 and across Rcircuit1 210 and $R_{circuit2}$ 230. However because a portion of the circuit, Rs 208, must service multiple circuits, see FIG. 1, it may be required by a standard (i.e., the National Electric Code (NEC)) to have a much lower impedance than $R_{circuit1}$ 210 and $R_{circuit2}$ 230 which is part of only one circuit with typically a lower current rating (e.g., $I_{(Rs)}$ may be designed for 150 A continuous current, while the electric circuit may be designed for 15 A, therefore $R_s$ may have a much lower resistance than $R_{circuit1}$ or $R_{circuit2}$). The electric circuit 200 has a circuit parasitic resistance, including wire resistance and receptacle resistance, expressed as $R_{circuit1}$ 210 and $R_{circuit2}$ 230. The household electric circuit 200 may have multiple electric loads connected in parallel, one of the loads being the vehicle battery charger 212. Other loads may include load1 (e.g., a refrigerator) 214, load2 (e.g., a washing machine) 216, load3 (e.g., lights) 218, or other electric components. The loads, being connected in parallel, have generally the same voltage applied to each. However, there will be variations dependent upon factors such as wire length and wire gauge between each load that results in individual resistances that cause voltage drops dependent on individual load current draw. In circuit 200 the voltage drop across the loads will caused by the sum of the currents flowing through each resistance individually. The voltage of the charger may be expressed as $$V_{charger}=V_S-[I_S\cdot(R_{circuit1})]-(I_{Charger}+\Sigma_{i=2}^{n}I_{loadi})\cdot(R_{circuit2}), \quad (1)$$

where $$I_S=I_{Charger}+I_{load1}+I_{load2}+I_{load3}+\ldots+I_{loadn}. \quad (2)$$

If $I_{Charger}$ changes by a change ($\Delta I$), the voltage at the charger may be expressed as $$V_{charger}=V_s-(I_s+\Delta I)\cdot(R_{circuit1})-[(I_{Charger}+\Delta I+\Sigma_{i=2}^{n}I_{loadi})\cdot R_{circuit2}] \quad (3)$$

Combining equation 1 and equation 3 and solving for the change in charger voltage may be expressed as $$\Delta V_{charger}=\Delta I\cdot(R_s+R_{circuit1}+R_{circuit2}) \quad (4)$$

The power loss in the wire ($P_{(Wire)}$) may be solved and expressed as $$P_{(Wire)}=[(I_{Charger}+\Sigma_{i=1}^{n}I_i)^2\cdot(R_s+R_{circuit1})]+[(I_{Charger}+\Sigma_{i=2}^{n}I_i)^2\cdot(R_{circuit2})] \quad (5)$$

or expressed in an alternative form $$\Delta P_{Wire}=(I_{Charger}^2+2I_{Charger}\cdot\Sigma_{i=2}^{n}I_i)\cdot(R_s+R_{circuit1})+(I_{Charger}^2+2I_{Charger}\cdot\Sigma_{i=2}^{n}I_i) \quad (6)$$

Equation 4 is also valid for any current that is attributable to load2-$n$. For example, in load1 the current passes through $R_{circuit1}$ but not $R_{circuit2}$. The lack of passing through $R_{circuit2}$ reduces the load1 induced voltage drop across $V_{charger}$. In other words, the voltage drop would be more than if the current had originated from any of the other devices. Thus if the change in charger voltage is used with the calculated values of $R_{circuit1}$ and $R_{circuit2}$ based on a load current from load1 using equation 3, the current may be greater or equal to the calculated value. The difference between the actual current and the calculated current may be expressed as an error, this error would also be present if Equation 5 was used to calculate power loss and again the loss may be equal or higher than the calculated result from the equation. The power the charger 212 uses is equal to the charger current 220 multiplied by the charger voltage 222. Due to the desire to minimize the time to charge, the charger 212 may periodically monitor the charger voltage 222 and adjust the charger current 220 based on charger voltage 222. Other loads on the circuit may include load1 (e.g., refrigerator) 214 which may have a power rating of approximately 600 Watts, load2 (e.g., washing machine) 216 which may have a power rating of approximately 600 Watts, a dishwasher which may have a power rating of 1,200 Watts, or load3 (e.g., incandescence lights) 218.

When loads are connected in parallel, the total current $I_s$ is the sum of the individual load currents, see Equation 2, and may exceed the trip point of a circuit breaker.

Figure 3:
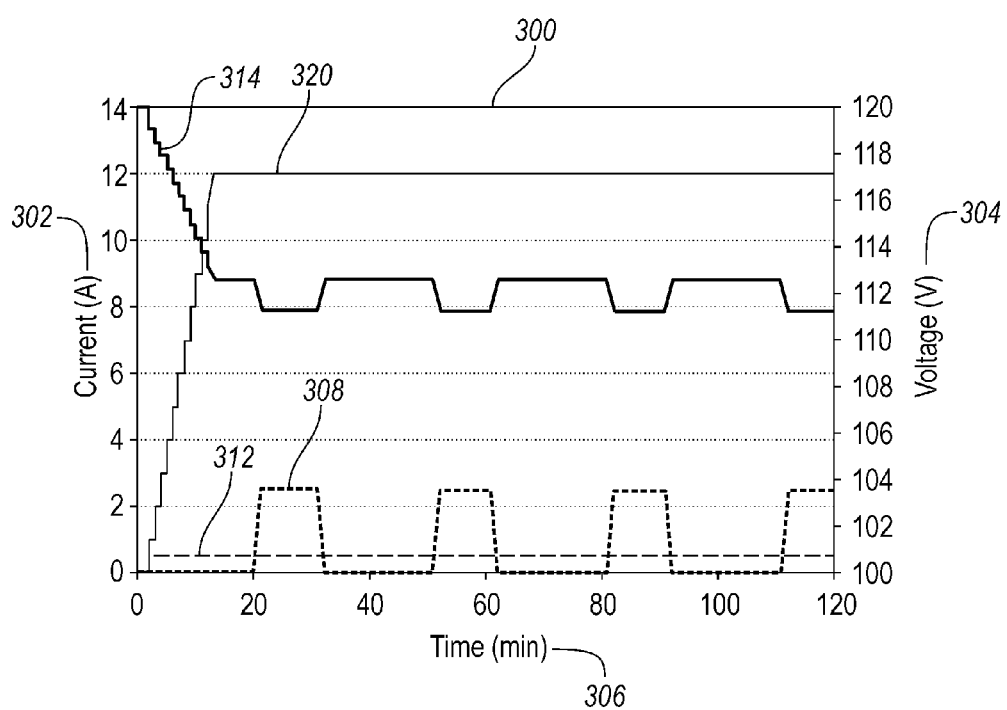
FIG. 3 is a graph of the impact of different electrical loads on the exemplary household electric circuit.

FIG. 3 is a graphical representation 300 of load currents and the associated circuit voltage ($V_{charger}$) in relation to time. Each individual load has a current 302 that impacts the $V_{charger}$ voltage 304 as the current draw changes over time 306. The individual currents shown in the graph are refrigerator current 308, vehicle charger current 320 and lighting current 312. Appliances have operational characteristics which may be classified as pattern evidence, analogous to tire tread or human footwear patterns. Some appliances have a generally linear current draw (e.g., Incandesce lights), some have patterns indicative of different cycles during operation (e.g., dishwasher, washing machine, sump pump) and other appliances are generally periodic (e.g., a refrigerator). Consider the periodic fluctuation of the current profile 308. This fluctuation results in a drop of the electric circuit voltage 314, measured at charger 222, due to Equation 3 in association with the current draw of the load (e.g., the refrigerator).

Consider the time interval of FIG. 3 from approximately 2 seconds to 8 seconds. During this interval, the charger current is incremented up and no other currents are changing on circuit 110. Before and after each step or a group of steps the $V_{charger}$ can be measured at the same time as $I_{Charger}$. At each point in time, the voltage at the charger may be expressed by Equation 3 and the change in charger current may be expressed by Equation 4 by applying Equation 1, in which $V_{charger1}$ is the voltage 222 measured at the battery charger 212 at the first point in time. Due to the electrical characteristics of the transformer 202, and the low resistance of the line between the transformer and the breaker box ($R_s$) 208, the change in voltage $V_S$ relative to $E_s$ may be negligible over a change in time when the change in time, commonly referred to as a time interval or a time period, is small. A small time interval, (e.g., approximately 2 seconds or less), is preferred to reduce instances in which $E_s$ may change. This allows Equation 4 to express the electric circuit resistance 210 as $$R_{circuit1}+R_{circuit2}=\frac{V_{charger1}-V_{charger2}}{I_{charger2}-I_{charger1}} \quad (7)$$

or in an alternative form as $$R_{circuit1}+R_{circuit2}=\frac{\Delta V_{charger}}{\Delta I_{charger}} \quad (8)$$

The combination of Equations 1 and 2 as expressed in Equations 4 and 5 is valid based on the assumption that the $V_S$ does not change over time.

Now consider the time range, in FIG. 3, from 20 seconds to 40 seconds. During that time range, a periodic voltage change can be seen that may be attributed to load1 308. Determining the resistance (e.g., application of equation 8) and estimating the minimum change in current caused by the load (e.g., utilizing equation 4), the type of load may further be characterized. Based on the change in charger current and change in charger voltage measured compared with data collected from a fleet of test vehicles and test appliances, the type of load may be characterized as a refrigerator located on the same circuit.

Referring back to FIG. 1, due to the wire size and material, a resistance of the circuit from the transformer 102 to the breaker box 112 is generally much less than the resistance from the breaker box 112 to the electric outlets 116. Applying this to FIG. 3, the resistance $R_s$ 208 is generally insignificant in relation to the resistance $R_{circuit}$ (210, 230). However, effectively calculating $R_{circuit1}$ and $R_{circuit2}$ (210, 230) may be accomplished by determining an optimal time period. If the time period is too small, the sensitivity or resolution requirement, of the changes in current and voltage, may be very large. This may be attributed to the changes being small fluctuations that are difficult to measure. If the time period is too large, then the voltage $V_S$ may not be constant during the time period, thus reducing the accuracy of the result.

Once $R_{circuit1}$ and $R_{circuit2}$ are determined, Equation 5 and Equation 6 may be used to estimate the power dissipated in the wire or circuit. The circuit is generally limited to a maximum continuous value (e.g., NEC code requirements). The voltage drop while maintaining the current will result in a lower charging power. However, the meter 114 will record both the power dissipated in the wire and the charging power. The result is the customer may be charged for the power loss in the wire, may incur longer charge times and in the case of other loads, may risk overloading the circuit breaker.

If $R_s$ is small compared to $R_{circuit1}$ 210+$R_{circuit2}$ 230, the circuit wiring efficiency ($\eta$) for charging based on Equation 5 may be expressed as $$\eta \leq 1 - \frac{Power_{wire}}{Power_{charger}} \tag{9}$$

Figure 4A:
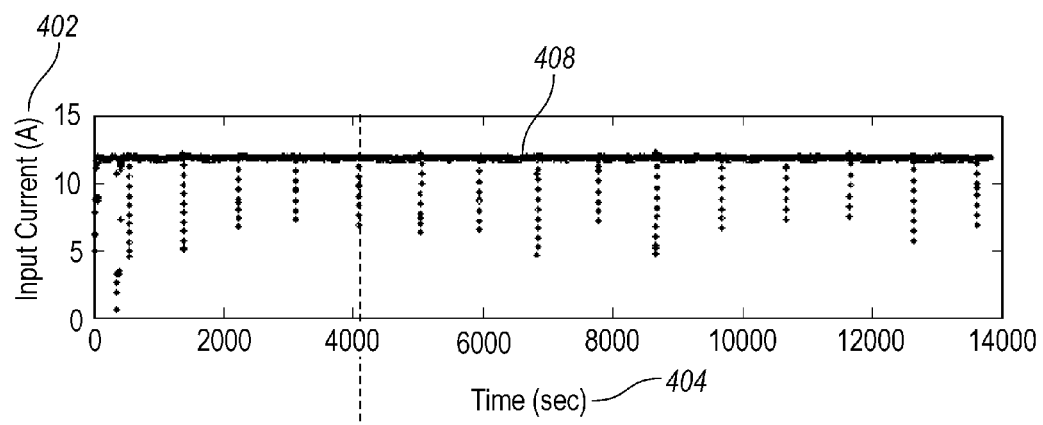
FIG. 4A is a graphical view of the battery charger input current with respect to time for the exemplary household electric circuit.
Figure 4B:
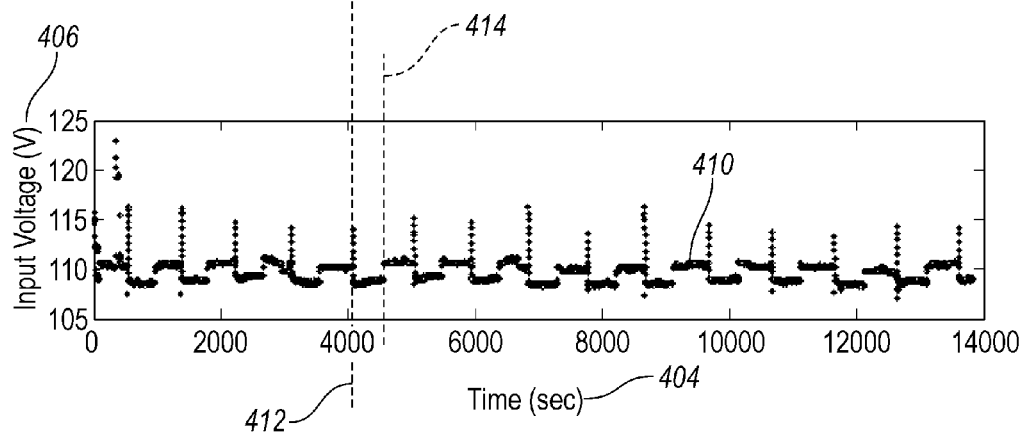
FIG. 4B is a graphical view of the input voltage with respect to time for the exemplary household electric circuit.

FIG. 4A is a graphical view of measured charger input current 402 with respect to time 404 for an exemplary household electric circuit. FIG. 4B is a graphical view of measured charger input voltage 406 with respect to time 404 for the household electric circuit. The charger input current 408 generally remains constant over time 404, however the charger input voltage 410 is shown to change over time. This change over time may be attributed to the operation of appliances load1 to loadn (e.g., the refrigerator, the washing machine and lights) connected with the electric circuit. As the appliances draw current (load1 current 224, load2 current 226 and load3 current 228), the voltage of other electric components connected in parallel will drop accordingly. When the appliance is turned on at a time 412, a voltage drop occurs to all connected electric components. The charger, monitoring the line voltage, detects the drop in line voltage at time 412 and in response to the drop in line voltage, reduces the current draw. This is shown as the corresponding short drop in the input current 408 at the time 412. The charger continues to monitor the line voltage and in response to the line voltage stabilization, the charger resumes charging operations. The line voltage increases at time 414 may be attributed to a reduction in current draw by the appliance detected at the time 412.

Figure 5A:
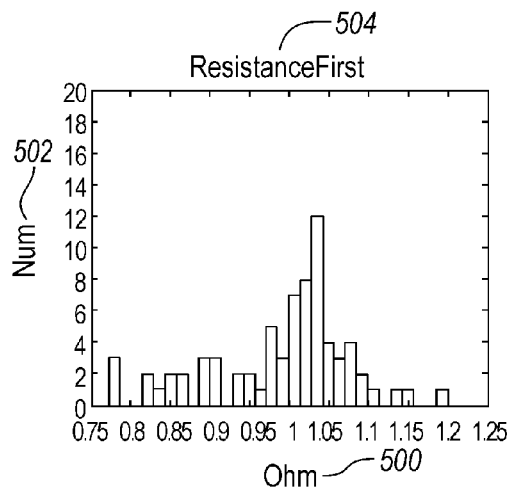
FIG. 5A is a graphical view of a histogram of a circuit resistance, based on a first sample interval, of the exemplary vehicle charging system.

FIG. 5A is a graphical view of a histogram of a circuit resistance 504, based on a first sample interval, of an exemplary vehicle charging system. The x-axis is circuit resistance 500 and the y-axis is number of occurrences 502. The histogram 504 may be useful information for a vehicle user, for example, this data may be displayed as resistance, converted to power loss by applying equation 6, or converted to circuit wiring efficiency by applying equations 7 or 8 and may provide charge location when GPS information is available. Also, this data may be useful to $3^{rd}$ parties including but not limited to vehicle companies, utility companies, battery suppliers, charge station owners or component manufacturers. This data may help vehicle operators, owners and $3^{rd}$ parties understand the power loss, efficiency, service and may even notify contractors that there is a need for repair of the vehicle charging system. This data may also help identify wire or component degradation when comparing resistance from charge to charge. Or to provide notification of power loss in the wiring used to power the vehicle charging system to promote a reduction in power loss. This data may be provided, transmitted or sent to an electronic consumer product (e.g., a smart phone, tablet, personal computer, or server) or to a display in the vehicle (e.g., instrument cluster, vehicle information center, vehicle infotainment display, or electronic face plate). This information may be displayed by the vehicle the next time the operator uses the vehicle, or displayed on demand by the vehicle operator.

Figure 5B:
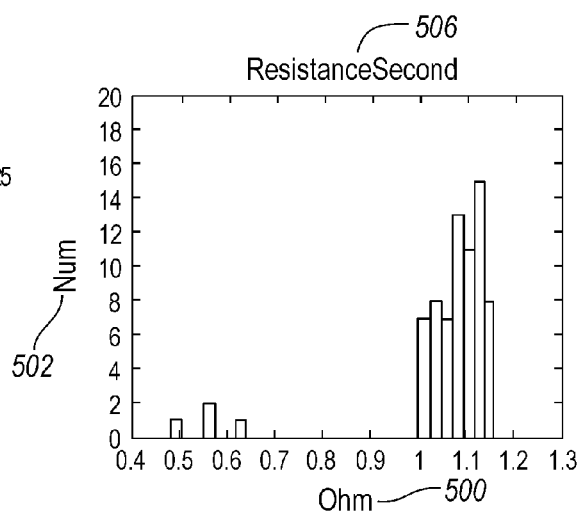
FIG. 5B is a graphical view of a histogram of the circuit resistance based on a second sample interval of the exemplary vehicle charging system.

FIG. 5B is a graphical view of a histogram of the circuit resistance based on a second sample interval of time 506 (e.g., an end time of the charge procedure) of an exemplary vehicle charging system. The x-axis is circuit resistance 500 and the y-axis is number of occurrences 502. Again these values can be used to identify changes and to notify vehicle operators, owners and $3^{rd}$ parties by providing data representing the power loss, efficiency, service and may even notify contractors that there is a need for repair of the vehicle charging system. This data may also help identify wire or component degradation when comparing resistance from charge to charge. Or to provide notification of power loss in the wiring used to power the vehicle charging system to promote a reduction in power loss. This data may be provided, transmitted or sent to an electronic consumer product (e.g., a smart phone, tablet, personal computer, or server) or to a display in the vehicle (e.g., instrument cluster, vehicle information center, vehicle infotainment display, or electronic face plate). This information may be displayed by the vehicle the next time the operator uses the vehicle.

Figure 5C:
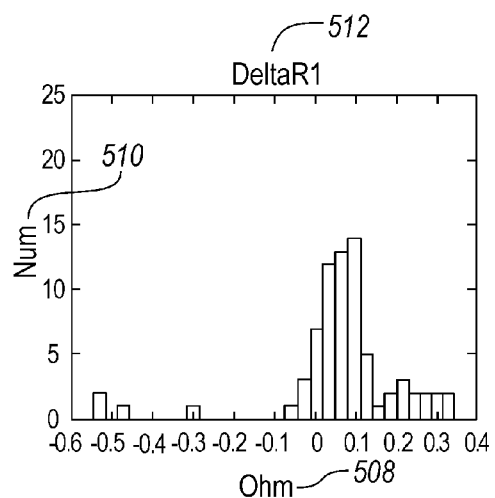
FIG. 5C is a graphical view of a change in a circuit resistance, based on the first and second sample interval, of the exemplary vehicle charging system.

FIG. 5C is a graphical view of a change in a circuit resistance, based on the first and second sample interval, of the exemplary vehicle charging system. The x-axis is change in circuit resistance 508 and the y-axis is number of occurrences 510. In this example, based on data from FIG. 5A and FIG. 5B, a histogram 512 of the change in resistance from the first interval of a battery charge procedure to the second time interval is illustrated. This change in resistance may be attributed to multiple factors, including a change in wiring or circuit temperature. The change in temperature associated with the change in resistance may be expressed as $$R_2 = R_1(1 + \alpha \cdot \Delta T) \tag{10}$$

$$\Delta T = \frac{R_2 - R_1}{\alpha \cdot R_1} \tag{11}$$

in which $\alpha$ is a constant generally equal to 0.393% $K^{-1}$ for copper wire.

Figure 5D:
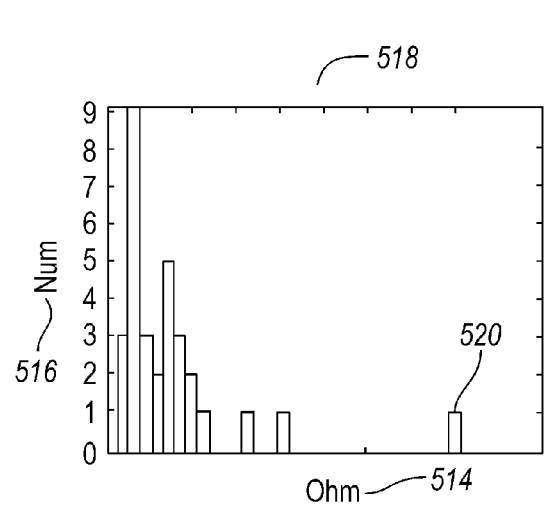
FIG. 5D is a graphical view of a histogram of a circuit resistance, based on a sample interval, of an exemplary vehicle charging system.

FIG. 5D is a graphical view of a histogram of a circuit resistance, from another vehicle based on a sample interval, of a vehicle charging system. The x-axis is circuit resistance 514 and the y-axis is number of occurrences 516. In this example, the number of times a resistance was calculated during the first interval of a battery charge procedure is illustrated as a histogram 518. In this histogram 518, a charge was performed in which the resistance was calculated to be approximately 3 Ohms 520. Applying equation 6 using an average of the current 408 from FIG. 4A results in a power loss of approximately 500 watts. Considering a 120V 15A circuit capable of 12 A continuously (per NEC Req.), this circuit resistance may result in the charger utilizing 1000 W to charge the battery with a power loss by the electric circuit to the charger (e.g., the wire) of approximately 500 W, the electric meter would report 1500 W of energy used. This data may be transmitted or sent within the vehicle using vehicle data networks (e.g., CAN, FlexRay, LIN or Ethernet AVB such as 802.1BA) or via non-vehicular wire line (e.g., IEEE802.3, IEEE 1394 or UART) and wireless or cellular data networks (e.g., IEEE 802.11, 802.15, 802.16, GSM or CDMA).

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle charging system comprising:
    a battery charger configured to be coupled with household circuitry; and
    a controller programmed to reduce current draw of the charger responsive to a comparison between data associated with a plurality of changes in charger input current and charger input voltage at different instances of time during a same charging event and data associated with other vehicles and appliances indicating an appliance is drawing current from the household circuitry.

2. The system of claim 1, wherein the controller is further programmed to transmit a signal indicating the appliance is drawing current from the household circuitry.

3. The system of claim 1, wherein the different instances of time occur during a predefined time interval.

4. The system of claim 3, wherein the predefined time interval is 50 microseconds to 2 seconds.

5. A vehicle comprising:
    a battery charger coupled with household circuitry; and
    a controller programmed to, responsive to a comparison between
        data associated with a resistance of the household circuitry derived from changes, over a time interval during a same charging event, of a charger input current and a charger input voltage, and
        data associated with other vehicles and appliances; indicating an appliance is drawing current from the household circuitry, reduce current draw of the charger.

6. The vehicle of claim 5, further comprising a display coupled to the battery charger and configured to display information related to the comparison.

7. The vehicle of claim 5, wherein the controller is further programmed to transmit a signal indicating the appliance is drawing current from the household circuitry.

8. A method comprising:
    measuring a plurality of changes in input voltage and input current of a battery charger electrically connected with household circuitry during a predetermined time interval while the battery charger is charging a battery; and
    reducing current draw of the charger responsive to a comparison between data associated with the plurality of changes and data associated with other vehicles and appliances indicating an appliance is drawing current from the household circuitry.

9. The method of claim 8, further comprising transmitting a signal indicating the appliance is drawing current from the household circuitry.

* * * * *